United States Patent [19]

McVicker et al.

[11] 4,410,159
[45] Oct. 18, 1983

[54] ADJUSTABLE SUPPORT FOR A VIDEO DISPLAY TERMINAL

[75] Inventors: Harry J. McVicker, Pottstown; Norman Olson, Philadelphia, both of Pa.; Richard F. Saurer, Salt Lake City, Utah; John C. Schulte, Plantation, Fla.

[73] Assignee: Sperry Corporation, New York, N.Y.

[21] Appl. No.: 283,261

[22] Filed: Jul. 14, 1981

[51] Int. Cl.³ .............................................. A47B 91/00
[52] U.S. Cl. ................................... 248/349; 248/425; 248/183
[58] Field of Search ............... 248/349, 371, 183, 179, 248/425; 108/1, 8, 6, 139, 142

[56] References Cited

U.S. PATENT DOCUMENTS

| | | | |
|---|---|---|---|
| 2,796,226 | 6/1957 | Dalton et al. | 248/183 |
| 2,898,163 | 8/1959 | McMahan | 248/425 |
| 3,970,792 | 7/1976 | Benham et al. | 248/183 |
| 4,019,710 | 4/1977 | O'Connor et al. | 248/181 |
| 4,068,961 | 1/1978 | Ebner et al. | 403/55 |
| 4,098,485 | 7/1978 | Mizelle | 248/425 |

*Primary Examiner*—J. Franklin Foss
*Assistant Examiner*—Sarah A. Lechok
*Attorney, Agent, or Firm*—John B. Sowell; Thomas J. Scott; Marshall M. Truex

[57] ABSTRACT

An adjustable support for a display terminal is provided which comprises a novel moulded base element having a pair of concave tracks in the top and an annular recess in the bottom. The concave tracks in the top of the base are adapted to receive and support a moulded cradle element which serves as a housing for the CRT display. The annular recess in the bottom of the base receives an annular support ring which is adapted to support the base and the cradle. The three moulded elements are designed to fit together and maintain contact with each other by gravity so as to provide a low cost accurate adjustable support.

10 Claims, 5 Drawing Figures

ADJUSTABLE SUPPORT FOR A VIDEO DISPLAY TERMINAL

BACKGROUND OF THE INVENTION

1. Field of the Invention

The invention relates to an adjustable support for a visual display terminal (VDT). More particularly, the apparatus of the present invention comprises a moulded plastic support of three elements which provides vertical, horizontal and rotational adjustment and support for a VDT.

2. Description of the Prior Art

Video display terminals (VDT's) are well-known. Numerous VDT's have control keyboards integral with the cathode ray tube (CRT) housing. Once the keyboard is placed in the desired position for operation of the keyboard, the angle of view of the CRT by the operator is fixed. When the keyboard is fixed to the CRT, there is little flexibility in changing the CRT position for optimum viewing.

Video display terminals having separate movable CRT's coupled to a stand-alone keyboad are known, however, the face of the CRT is not easily moved to an infinite number of positions without the necessity of moving the complete support housing or parts of the complete support housing.

Tilting stands are classified in class 248, subclasses 127 and 133. These classes include numerous cradle arrangements and rocker stands. Prior art tilting support stands employ a plurality of complex parts which require substantial skill in their assembly and additional skill for optimum adjustment of the assembly. Prior art tilting support stands are usually mounted on anti-friction rollers or bearings which require some type of locking device to assure that the position selected for the cradle or tilting support will be maintained in its normal position during use.

It would be desirable to provide a support stand for the CRT of the VDT which is adjustable for tilting as well as laterally in a rotational direction without a necessity for locking devices to maintain a preset or desired position.

SUMMARY OF THE INVENTION

It is a principal object of the present invention to provide a novel low cost moulded plastic support stand for the CRT of the VDT.

It is yet another object of the present invention to provide a novel adjustable support stand for a VDT which permits ease of manual adjustment.

It is yet another object of the present invention to provide a precision moulded plastic support stand that is simple to assemble without the requirement for adjustments.

It is a general object of the present invention to provide a CRT support stand that has forty degrees of tilt adjustment and an infinite angle of swivel adjustment and is maintained set in any of its adjustable positions.

It is yet another general object of the present invention to provide a three piece tilt and swivel support stand for a CRT which is manually adjustable without the requirement of locks.

According to these and other objects of the present invention to be discussed hereinafter, there is provided a moulded base element having a pair of concave tracks in the top and an annular recess in the bottom, the concave tracks receive and support a moulded cradle element adapted to contain and support a CRT therein. The annular recess receives an annular support ring adapted to support said base and said cradle. The three assembled CRT support elements are maintained in contact with each other by gravity and are provided with keepers to assure the assembly does not come apart.

DESCRIPTION OF THE PREFERRED EMBODIMENT

Figure 1:
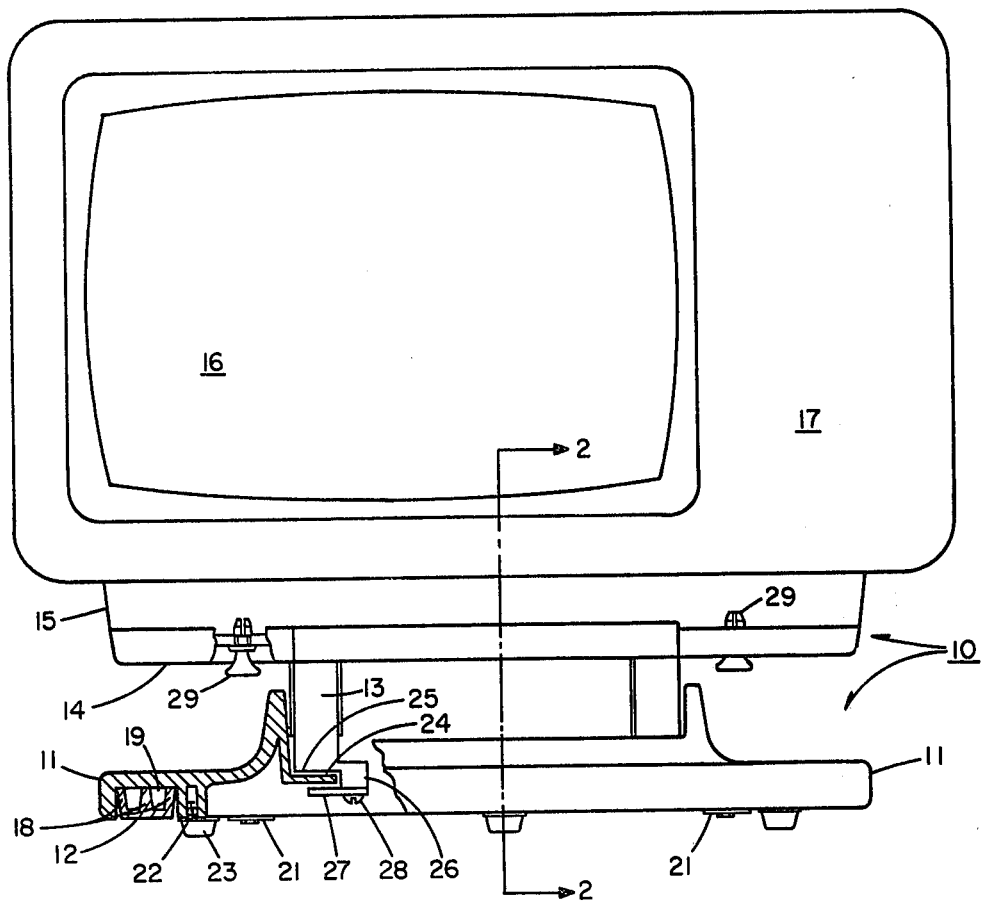
FIG. 1 is a front view in elevation and partial section of the novel adjustable support assembly.

Refer to FIG. 1 showing in front elevation a preferred embodiment adjustable support assembly 10. The assembly 10 preferably comprises three basic elements. The moulded base element 11 is supported and movable on a moulded support ring 12. The movable base forms a bearing surface and receiving tracks for supporting the moulded cradle element 13. As will be explained hereinafter, the moulded cradle element 13 may be integrally moulded with a housing for a CRT. For purposes of explaining the present invention, the cradle 13 comprises a table 14 which is adapted to connect to and receive the CRT housing 15 shown as a separate element. The CRT 16 is shown off-set mounted in housing 15 to provide an area 17 for the mounting of controls. It will be understood that the control mounting area 17 may or may not be used. The controls may be mounted below the CRT 16 on the housing 15 or the controls may be mounted into the keyboard (not shown).

Moulded support ring 12 is shown provided with three upward extending ribs 18 which are designed to provide bearing surfaces at the top of the rib which engaged the bottom of the annular recess 19 in base 11. When the annular ring 12 or the recess 19 of the base element 11 are made of plastics such as tetrafluoroethylene (TFE)-filled acetal such as DELRIN ® there is provided self-lubrication between the moulded plastic elements. The moulded support ring 12 fits loosely in recess 19 and is maintained in the recess 19 by keepers 21 comprising washers and screws. The screws are mounted in moulded bosses 22 provided on base 11. The annular shape moulded support ring 12 is further provided with resilient feet 23 equally spaced around the support ring. Preferably the resilient feet 23 are integrally moulded with the annular ring 12 or may be attached by adhesives or other means if moulded separately.

Moulded base element 11 in addition to providing an annular recess 19 for receiving the annular support ring 12 is further provided with a pair of concave tracks 24 formed on the arc of a cradle and adapted to receive a pair of convex track elements 25 on said moulded cradle element 13. Extending downwardly from the convex track elements 25 is a downward extension 26 which serves as a lateral guide for the cradle movably mounted in tracks 24 and further serves as a stop for the limits of excursion of the angle of tilt of the cradle 13.

The downward extensions 26 are provided with tapped recesses to receive keeper arms 27 which are attached to the downward extension 26 by screws 28.

It will be understood that track 24 preferably does not actually engage track 25 in a manner similar to the friction ribs 18 engaging the recess 19. In the preferred embodiment of the present invention small low-friction-bearing pads are provided as will be explained in greater detail hereinafter to control the proper amount of friction between tracks 24 and 25. As explained hereinbefore, the cradle element 13 could be integrally moulded with the housing 15, however, the present invention is illustrated with a separate housing 15 and cradle 13. There is provided in the table portion of cradle 13 a snap connector 29 which locks the CRT housing 15 to the cradle 13. Such snap connectors are well-known moulded plastic parts and are commercially available under several trade names.

Figure 2:
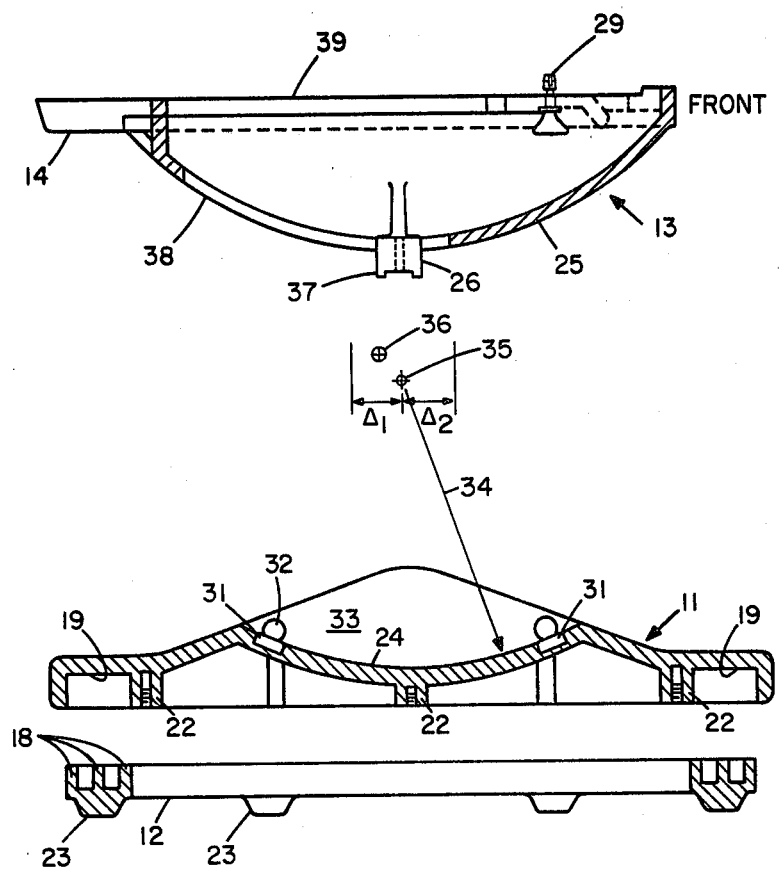
FIG. 2 is a side view shown in exploded section taken at lines 2—2 of FIG. 1.

Refer now to FIG. 2 which is a section in side view elevation taken at lines 2—2 of FIG. 1. FIG. 2 has been shown as an exploded view to more clearly illustrate the three basic moulded plastic parts of the assembly 10. The annular support ring 12 is shown comprising the aforementioned ribs 18 and feet 23. Moulded base element 11 is shown having recesses 19 for receiving the annular ring 12 and having bosses 22 for receiving the keepers which retain annular support ring 12 in the base element 11. The concave tracks 24 of moulded base element 11 are provided with recesses for receiving snap-in low-friction bearings 31 which support the cradle in a vertical direction. Further, lateral low-friction bearing elements 32 are provided in recesses of lateral retaining wall 33 of the base element 11. It will be understood that the low-friction bearing 31 and 32 may be made from polypropylene or equivalent plastic materials. It will be understood that when either track, preferably the cradle track, is more completely of a low-friction plastic such as polypropylene or similar material that the low-friction bearing elements may be provided by making the tracks 24 or 25 of such plastics. For example, if the cradle tracks 25 is made smooth and arcuate of a low-friction plastic then a raised element the shape of low-friction bearing 31 may be provided on an ordinary moulding plastic track 24 of the base 11. The purpose for providing a raised surface for bearing contact is to assure that the proper amount of friction is controlled so that movement of the housing 15 to adjust the CRT 16 to a desired position is maintained once it is set in its manual adjusted position.

The arcuate concave track 24 is shown having an approximate radius of curvature 34 which is described by the arc drawn from the focal point 35. In the preferred embodiment support assembly there is a center of gravity of the CRT which is approximately the same as the center of gravity of the CRT and its housing 15. This center of gravity is represented by point 36. It will be noted that the center of gravity 36 need not be coincident with the focal point 35 but may deviate to the front by a deviation factor of $\Delta 1$ or to the rear by deviation factor of $\Delta 2$. Further, the center of gravity may be slightly above or slightly below the focal point 35 and still maintain the preferred mode of operation to be described in greater detail hereinafter.

The cradle 13 is shown having an arcuate convex track 25 which matches the radius of curvature of the track 24 of the base 11. The track 25 is understood to be at the lateral edge portions of the cradle 13 and is provided with an air circulation opening 38 therebetween.

The air circulating through the opening 38 can continue through the opening 39 and circulates into the housing 15 of the CRT 16 to maintain the CRT in a cool condition. The CRT housing 15 is not shown attached to the cradle 13 but one of the two snap connectors which attaches to the housing 15 is shown. The downward extension 26, which is formed integral with the track 25, is shown provided with a bifurcated end 37 which is adapted to receive the keeper arm 27 (not shown). It will be understood that the downward extension 26 also serves as a tilt stop when cooperating with the base element 11 as will be described in FIG. 3.

Figure 3:
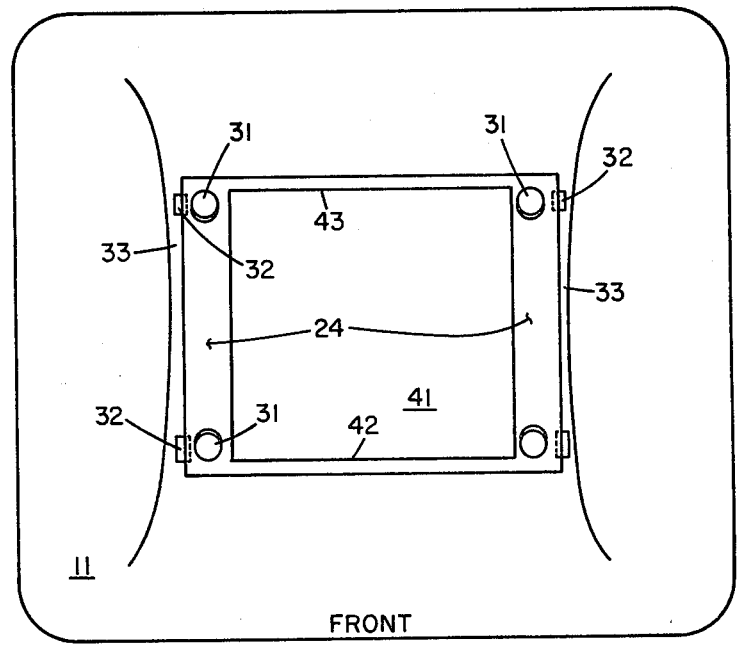
FIG. 3 is a top view of the moulded base element.

Refer now to FIG. 3 which is a top view of the base element 11. The concave tracks 24 are provided at either side of an opening 41 which permits the air to enter and flow through the aforementioned openings 38 and 39. The front side of opening 41 provides a stop 42 and the rear side of opening 41 provides a stop 43 which cooperates with and engages the downward extension 26 on cradle 13. Thus, it will be understood that once the cradle is in place, its tilting motiion is limited by the engagement of extension 26 with the stops 42 and 43. In the preferred embodiment of the present invention when the extension 26 of cradle 13 is in the center of the opening 41, the face of the CRT 16 is directed upward approximately ten degrees. It will be understood that the height of the support and the size of the CRT will cause this dimension to change so that the eye of the operator is looking downward approximately ten to fifteen degrees to view the CRT in its preferred-angular arrangement. In the preferred embodiment shown, the center of the CRT is approximately ten inches above the height of a normal twenty-nine inch table top surface on which the CRT 16 would be placed.

Base 11 is also shown having low-friction bearings 31 and 32 snap into the tracks 24 and lateral retaining walls 33 respectively. The low-friction bearings are preferably made from a suitable plastic or as described hereinbefore could be moulded extensions of base 11 when the cradle is made of low-friction plastic. Thus, it will be understood that there are several ways in which the proper amount of friction bearing surface area can be provided.

Figure 4:
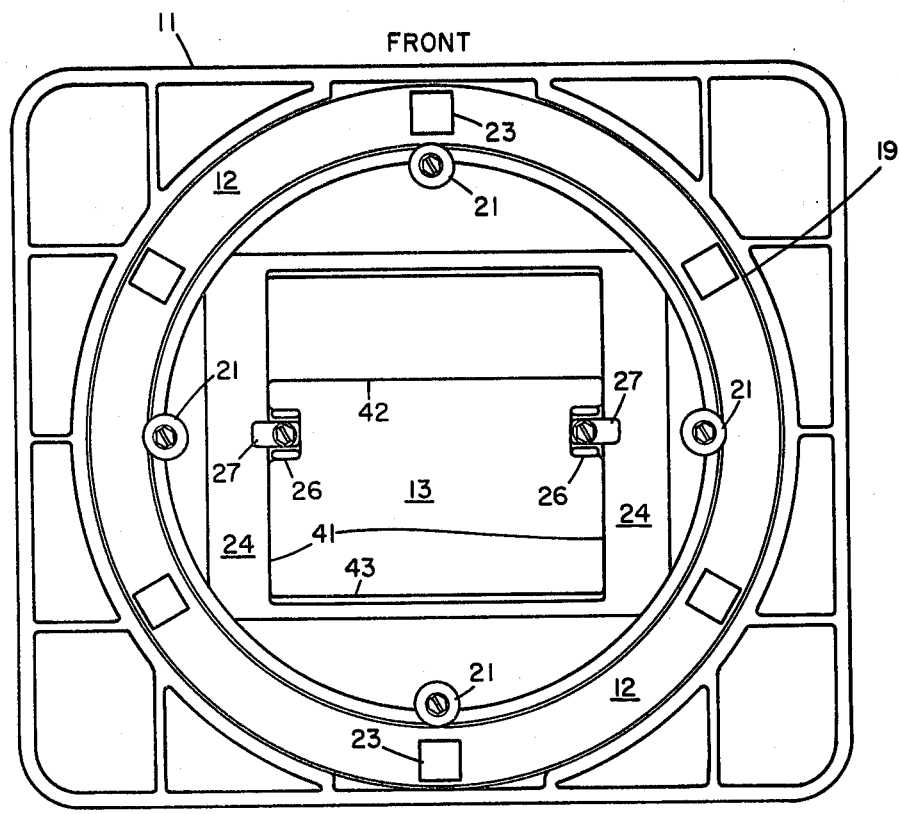
FIG. 4 is a bottom view of the assembly of FIG. 1.

Refer now to FIG. 4 which is a bottom view of the prefered assembly 10. The numbers of the elements in FIG. 4 are the same as those in FIGS. 1 to 3. The moulded annular ring 12 is shown in the recess 19 of base 11 and maintained in its preferred position by keepers 21. The bottom of the moulded cradle 13 is shown provided with the downward extensions 26 which are further provided with the keeper arms 27 which lock under the tracks 24 of base 11. The front stop limit 42 and rear stop limit 432 which form edges of the opening 41 are adapted to cooperate with the front and rear edges of the downward extension 26 to prevent the CRT 16 from tilting beyond the desired design limits. The feet 23 which are preferably moulded into the annular support ring 12 need only be higher than the keepers 21 to prevent the screws of the keepers 21 from scratching or dragging upon the table top surface upon which the assembly 10 is placed. It will be understood from the examination of FIG. 4 that the assembly comprising the elements 11, 12 and 13 are held together by gravity and need only be stacked together to form a finished assembly. However, the keepers 21 and 27 maintain the assembly together when it is moved from one place to another and serve no other useful function and there is no adjustment to be made when the moulded elements are assembled.

Figure 5:
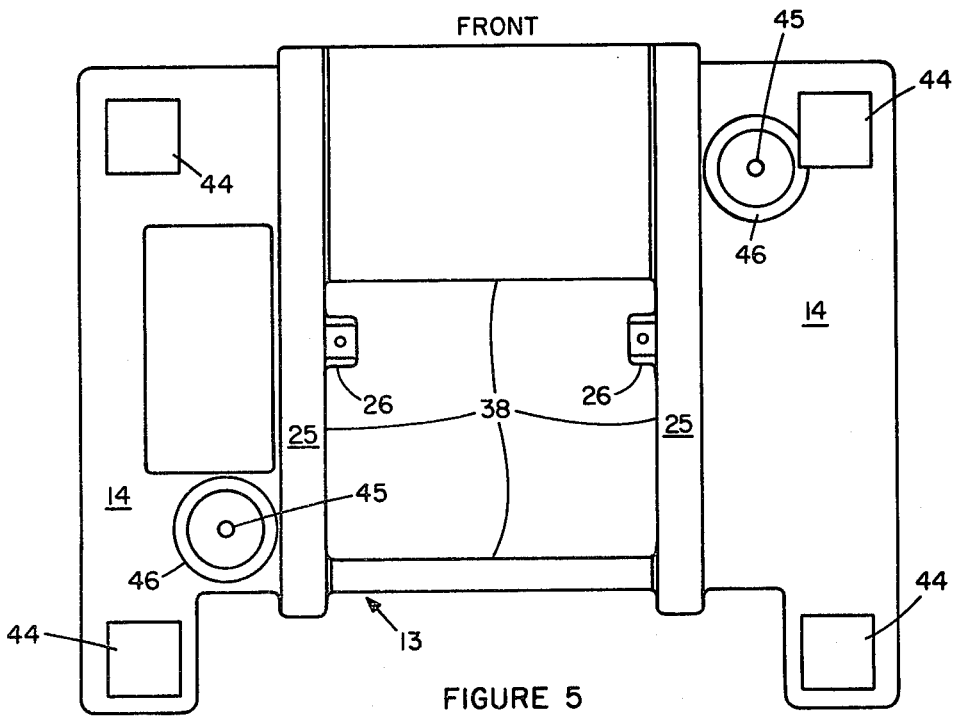
FIG. 5 is a bottom view of the moulded cradle element.

Refer now to FIG. 5 showing a bottom view of the cradle 13. As described hereinbefore, the cradle 13 is provided with a large opening 38 for air to circulate to the CRT 16. The downward extensions 26 are shown attached to the pair of convex tracks 25 which have been described in detail hereinbefore. FIG. 5 clearly shows that the tables 15 are provided as lateral extensions extending from the track 25 area. The tables 14 are provided with rectangular apertures 44 which are adapted to receive the feet of the housing 15 in which the CRT 16 is mounted. It will be understood that the CRT housing 15 may be moulded integrally with the cradle 13 and the table area 14, thus, receiving apertures 44 may be completely eliminated. Also shown in the table 14 area are apertures 45 which receive the snap connectors 29 described hereinbefore. Surrounding the apertures 45 are recesses 46 moulded integrally into the table 14 for hand access.

Having described a single preferred embodiment of the present invention it will be understood that various sizes of CRT's may be mounted on adjustable support assemblies of the type described hereinbefore. In the preferred embodiment of the present invention, the three basic elements 11, 12 and 13 only weigh approximately one and a half to two pounds. Thus, the entire weight of the video data terminal may be referred to as the weight of the assembly. The radius of curvature of the tracks 24, 25 and the normal mid range preferred embodiment CRT will be approximately seven and a half inches and deviate as much as two and a half inches plus or minus and achieve the desired results described hereinbefore. It has been found that the low-friction bearings or snap-in bearings 31 made of polypropylene or other suitable types of plastic will be approximately one half inch in diameter to achieve the desired torque range for moving the housing 15. Tests have shown that a torque in the range of 25 to 60 inch pounds for moving the housing 15 is the optimum and desired range for manual manipulation. Further, when the weight of the CRT is in the range of 35 to 65 pounds, the force on the edge of the housing to start movement of the housing will fall in the range of three to nine pounds. The upper limit of nine pounds is reached when the CRT weighs approximately 60 pounds. Similarly, the ribs of the annular ring 12 provide a bearing surface which provides a frictional drag or torque force of 33 to 40 inch pounds. This static torque starting force may be varied by varying the materials of support ring 12. In the preferred embodiment described herein, the annular support ring 12 is preferably made from TFE-filled acetal. The base element 11 is preferably made from a structural foam phenylene oxide-based resin such as NORYL ® or ABS plastics. The cradle 13 and the housing 15 may also be made of structural foam plastics. It will be understood that when the cradle 13 is made of a low-friction plastic such as polypropylene, the bearing elements 31 and 32 are not required.

We claim:

1. An adjustable support assembly for a video display terminal comprising:
    a moulded base element,
    said base element having a pair of concave tracks formed on an arc of a circle,
    said base element further having an annular recess therein,
    a moulded support ring movably mounted in said annular recess of said base element and said annular ring having a foot portion extending therefrom for supporting said base element on said support ring,
    said base element being rotatably mounted on said support ring,
    a moulded cradle element,
    said cradle element having a convex element movably mounted on said pair of concave tracks,
    said moulded cradle element further having means integrally formed therewith adapted to support a CRT housing thereon,
    said housing being rotatably movable on said pair of concave tracks about a focal point centered near the center of gravity said assembly to provide an adjustable angle of tilt to said housing.

2. An adjustable support assembly as set forth in claim 1 wherein the radius of curvature of said convex cradle element and said pair of concave tracks are substantially identical.

3. An adjustable support assembly as set forth in claim 2 wherein the focal point of said convex element of said radii of curvature of said cradle element and said tracks is located within fifteen degrees of the vertical center of gravity of the video display terminal to be supported.

4. An adjustable support assembly as set forth in claim 3 wherein said cradle element is frictionally engaged on said pair of tracks on said base element and the torque force at the center of gravity required to overcome the static friction of said cradle element in said tracks is in the range of 25 inch pounds to 60 inch pounds.

5. An adjustable support assembly as set forth in claim 3 wherein said cradle element is frictionally engaged on said pair of tracks on said base element and the torque force required to move said cradle element in said tracks by applying a force on said CRT housing of the video data terminal is in the range of four to nine pounds.

6. An adjustable support assembly is set forth in claim 4 wherein said table is adapted to support a video display terminal having a weight in the range of 35 to 65 pounds and having its center of gravity at the approximate focal point of said radii of curvature.

7. An adjustable support assembly as set forth in claim 1 wherein there is further provided a plurality of downward extensions formed on said cradle element, and
    a keeper arm attached to said downward extension and extending under said tracks of said base element to movably secure said cradle element to said tracks of said base element.

8. An adjustable support assembly as set forth in claim 1 wherein said moulded base element and said moulded cradle element are injection moulded from low-friction plastics.

9. An adjustable support assembly as set forth in claim 1 which further includes a plurality of low-friction bearing elements mounted on said concave tracks to provide point support of said cradle element and lateral restraint of said cradle.

10. An adjustable support assembly as set forth in claim 1 wherein said cradle element further includes a table for receiving said CRT housing.

* * * * *